United States Patent [19]

Weber

[11] Patent Number: 4,814,019
[45] Date of Patent: Mar. 21, 1989

[54] BENEFICIATED TALCS

[75] Inventor: Kenneth E. Weber, Pacific Palisades, Calif.

[73] Assignee: Cyprus Minerals Company, West Los Angeles, Calif.

[21] Appl. No.: 70,940

[22] Filed: Jul. 8, 1987

Related U.S. Application Data

[63] Continuation-in-part of Ser. No. 3,242, Jan. 14, 1987.

[51] Int. Cl.$^4$ .............................................. C04B 14/00
[52] U.S. Cl. ...................................... 106/469; 424/69; 524/451; 524/377; 524/385; 427/221; 523/205
[58] Field of Search .............. 106/308 M, 308 Q, 469; 424/69; 524/451, 377, 385; 427/221; 523/205

[56] References Cited

U.S. PATENT DOCUMENTS

| | | | |
|---|---|---|---|
| 3,553,158 | 1/1971 | Gilfillan | 523/466 |
| 3,803,065 | 4/1974 | Arai et al. | 523/205 |
| 4,116,897 | 9/1978 | Huszar et al. | 524/528 |
| 4,255,303 | 3/1981 | Keogh | 523/200 |
| 4,263,050 | 4/1981 | Yamanaka et al. | 106/287.17 |
| 4,411,704 | 10/1983 | Galeski et al. | 106/308 Q |

OTHER PUBLICATIONS

Bragg et al, *Plastics Engineering*, vol. 30, No. 9, pp. 30-32 (Sep. 1974).
Radosta, *Plastics Compounding*, Sep./Oct. 1979, pp. 23, 24, 26-28 & 30.
Mathur, et al, in *Society of Plastics Engineers Technical Papers*, vol. 25, pp. 663-667 (1979).
Shimizu et al, in Japanese Kokai 75 8,098, published Apr. 2, 1975 (*Chem. Abst.* 83: 98595j (1975)).
Tsunetsugu et al, Japanese Kokai 75 109,239, published Aug. 28, 1975 (Chem. Abst. 83: 207145k (1975)).
Rusznak et al, Muanvag Gumi, vol. 16, No. 9, pp. 257-261 (Hung. 1979; *Chem. Abst.* 92: 42775m (1980)).
Tokuyama Soda's Japanese Kokai 80 142,039, published Nov. 6, 1980 (*Chem. Abst.* 94: 122583d (1981).
Matsumoto et al, Japanese Kokai 78 65,346, published Jun. 10, 1978 (*Chem. Abst.* 89: 147656q (1978).
Goel et al, *Polym. Eng. Sci.,* vol. 20, No. 3, pp. 198-201 (1980) (*Chem. Abst.* 92: 129772g (1980)).
Research Disclosure, vol. 173, No. 19 (1978) (*Chem. Abst.* 89: 180758x (1978).

*Primary Examiner*—Joseph L. Schofer
*Assistant Examiner*—Peter D. Mulcahy
*Attorney, Agent, or Firm*—Lyon & Lyon

[57] ABSTRACT

Means are disclosed for rendering talcs such as Chinese talcs, Australian talcs, Italian talcs or like talcs which, when ground to an approximately 2.5-5.0 μm median particle size, exhibit a wet powder brightness of at least about 30% and which have hitherto been considered acceptable as fillers for thermoplastic resinous compositions, and particularly polypropylene molding resins, even suitable for this use. Such talcs are beneficiated in accordance with this invention, generally at low cost, to further enhance brightness, heat stability or both these properties in thermoplastic molded articles filled with these beneficiated acceptable talcs, while also improving or at least not unacceptably diminishing other significant physical properties, particularly tensile properties, of the resulting molded article. This is accomplished by admixing the Chinese, Australian or Italian talc, or the like, with an effective amount of a combination of:

(A) one or a mixture of certain octyl- or nonyl-phenol/poly(ethylene oxide) condensates, and
(B) one or a mixture of certain poly(ethylene glycols) or alkoxypoly(ethylene glycols).

11 Claims, No Drawings

BENEFICIATED TALCS

This application is a continuation-in-part of copending U.S. patent application Ser. No. 003,242, filed Jan. 14, 1987 of common assignment with this application.

FIELD OF THE INVENTION

This invention relates to novel, improved, beneficiated talcs. More particularly, this invention relates to means for further improving the performance characteristics of talcs hitherto considered suitable as fillers for thermoplastic resinous compositions, and to the resulting further improved talcs themselves. This invention also relates to thermoplastic resinous compositions filled with talcs which have been improved in accordance with the invention and to articles molded therefrom whose physical properties, particularly brightness or oven life (long-term heat stability), and preferably both of these properties, are also improved in comparison to those exhibited by molded articles filled with the corresponding unbeneficiated talcs.

BACKGROUND OF THE INVENTION

Talc is a relatively abundant, inexpensive, highly water-insoluble, hydrophobic and generally unreactive mineral. It can be categorized as a hydroxylated magnesium silicate and represented by, inter alia, one or more of the formulas:

$(Si_2O_5)_2Mg_3(OH)_2$, $Si_8Mg_6O_{20}(OH)_4$, or $Mg_{12}Si_{16}O_{40}(OH)_8$, disregarding impurities, which can include inorganics such as carbonates, other magnesium silicates, ferrous iron compounds and various organic materials. Such impurities generally occur in minute amounts, but can occur in major amounts as well; certain talcs, for example, can contain major amounts of dolomite or tremolite. The impurities found in talcs will vary as to type and amount depending on the geographic source of the talc. Even in minute amounts, however, impurities may exert a significant influence on a talc's in-use performance as a filler for thermoplastic molded articles.

Talc, being naturally organophilic, is highly compatible with and is easily wet by organic resins. Thus, it has come into widespread use as a filler in thermoplastic resinous compositions, including those containing polyolefins such as polyethylene, polypropylene and the like. Because of talc's thin platelet structure when finely ground, it is considered a reinforcing filler rather than an extender. Non-platy particulate mineral fillers such as calcium carbonate, on the other hand, are primarily extenders rather than reinforcing fillers. Polypropylene reinforced with talc, in particular, is widely used in appliance applications, where the color of the filled, molded resin is a major concern, and in automotive applications, especially under-the-hood automotive applications, where color is not a particular concern but increased stiffness, dimensional stability and resistance to heat distortion are of primary importance. Plastics producers prefer a talc filler which does not discolor at typical molding temperatures, particularly where the product will be decorative in nature, and which affords adequate impact strength and other tensile properties, and adequate long-term heat stability, to the molded plastic.

Two characteristics of a talc—its particle size distribution and its crude ore source—have been said to affect the properties of talc-filled polypropylene molded articles. Tests have shown that talc particle size distribution affects the stiffness or flexural modulus and tensile yield of a polypropylene molded article, with tensile yield being most affected when the talc filler's cumulative means particle size is less than 7 $\mu$m. Flexural modulus, on the other hand, has been shown to vary inversely with talc particle size. To further complicate the picture it has also been found that better long-term heat stability is generally realized with increased talc particle sizes; see Bragg et al, *Plastics Engineerging*, Vol. 30, No. 9, pp. 30-32 (September 1974).

The apparent particle size distribution in talc from any geographic source, as measured by typical gravimetric particle size distribution methods, can be made comparable to that of talc from any other source by grinding. However, matching the aspect ratio of talc from one geographic source by grinding talc from another geographic source which has a different aspect ratio cannot easily be accomplished. Geographic source itself—or more particularly the different kinds and amounts of impurities present in talcs from different geographic sources—raises another problem which is not so easily solved. Talcs from certain geographic sources, such as Montana talcs (Yellowstone and Beaverhead talcs, for example), have been found to be inferior to those from other sources, particularly California, as fillers for polypropylene. Bragg et al have shown, for example, that Montana talc-filled polypropylene is poorer in heat stability than California talc-filled polypropylene when treated at 365° F. for 16 hours, no matter when the particle size, coarse or fine, of the talc used, and that to obtain equal long-term heat aging performance, a higher overall heat stabilizer level must be used in Montana talc-filled polypropylene than in California talc-filled polypropylene.

A comparison of the chemical composition of theoretical and typical commercial talcs is given in Radosta, *Plastics Compounding*, September/October 1979, pp. 24, 26-28 and 30, at page 24 (Table I):

| | Theoretical pure talc | Montana talc | California talc | Vermont talc |
|---|---|---|---|---|
| $SiO_2$ % | 63.5 | 62.5 | 57.4 | 56.2 |
| MgO, % | 31.7 | 30.6 | 27.6 | 30.8 |
| CaO, % | | 0.3 | 6.2 | 0.4 |
| $Al_2O_3$, % | 0.5 | 1.4 | 0.5 | |
| $Fe_2O_3$, % | | 0.7 | 0.3 | 3.9 |
| Loss on ignition, % | 4.8 | 5.4 | 7.1 | 8.2 |

Mathur et al, in *Society of Plastics Engineers Technical Papers*, Vol. 25, pp. 663-667 (1979) reported on their studies of the deterioration of oven aging characteristics in heat-stabilized polypropylene moldings filled with certain high aspect ratio talcs. These authors found that "(t)he melt compounding of Montana talcs as well as Vermont talcs results in significant discoloration of molded parts, while California talcs do not discolor the matrix." No loss of mechanical properties, however, was seen to be associated with this discoloration. Mathur et al also found that while "(t)he primary source for polypropylene coloration by Montana and Vermont talcs is not well understood, . . . it can be minimized by the use of . . . processing aids, such as calcium stearate, carbowax and amide processing lubricants."

U.S. Pat. No. 3,553,158, issued Jan. 5, 1971 to Gilfillan and mentioned in the Mathur et al article, discloses heat-stabilized, talc-filled polypropylene molding resin compositions containing a "talc deactivating" organic polar compound, preferably an epoxide (particularly a polyepoxide), an amide, an acrylate polymer or an aliphatic polyol. According to Gilfillan, such compounds generally ". . . Will have a molecular weight greater than about 300; will contain one or more polar groups such as epoxide, aliphatic hydroxyl, ester, amide, ether or sulfide; and will preferably contain a non-polar organic group which makes them at least moderately compatible with the polymer, such as lauryl or stearyl";
see column 7, lines 41-58 in the Gilfillan patent. Carbowax 400 and Carbowax 6000 are sspecifically disclosed as "talc deactivating" compounds in Gilfillan's Table I, the talcs treated in the working examples were Montana talcs, and calcium stearate was included in the compositions of at least working examples 1-3.

Shimizu et al, in Japanese Kokai 75 8, 098, published Apr. 2, 1975 [Chem. Abst. 83: 98595j (1975)] disclose increasing the discoloration resistance of polypropylene homopolymer and copolymer molding compositions containing talc by adding thereto, as a "reforming agent", a polyalkylene glycol alkyl ether or polyalkylene glycol alkylphenyl ether such as a "polyalkylene glycol phenoxyether", polyethylene glycol octylphenyl ether, polyethylene glycol lauryl ether or polyethylene glycol/polypropylene glycol ether.

Other publications which disclose treating talc or talc-containing thermoplastic resinous compositions to improve the properties of thermoplastic resinous molded articles made from them include the following:

U.S. Pat. No. 4,115,897, issued Sept. 26, 1978 to Huszar et al, which discloses polyolefin molding compositions containing talc and a mixture of two surfactants—one of which can be alkylphenyl polyether—having different HLB values; see column 3, lines 1-17 and 67 and column 4, line 17.

Talc filler coated with at least one metallic salt of an 8-20 carbon atom-containing fatty acid, e.g., calcium stearate, is disclosed in U.S. Pat. No. 4,255,303, issued Mar. 10, 1981 to Keogh; see column 4, lines 13-32.

Mineral fillers such as talc coated with a thin layer of liquid ethylene oxide oligomer having a molecular weight of from 100-800 are shown in U.S. Pat. No. 4,411,704, issued Oct. 25, 1983 to Galeski et al; see column 2, lines 11-20 and 23.

Transparent polypropylene food packaging materials which are easily incinerated after use and which contain talc, a polyol ester such aspolyethylene glycol monostearate or glycerol distearate, and antioxidants and stabilizers, included among which is epoxidized soybean oil, are shown in Tsunetsugu et al Japanese Kokai 75 109,239, published Aug. 28, 1975 [Chem. Abst. 83: 207145k (1975)].

Rusznak et al, Muanvag Gumi, Vol. 16, No. 9, pp. 257-261 [Hung. 1979; Chem. Abst. 92: 42775m (1980)] discloses isotactic polypropylene compositions containing talc, a surfactant and an "elastomeric adhesion improver".

Talc-filled polypropylene molding compositions containing oleic amide as a processing aid together with BHT (butylated hydroxytoluene, an antioxidant) are taught in Tokuyama Soda's Japanese Kokai 80 142,039, published Nov. 6, 1980 [Chem. Abst. 94: 122583d (1981)].

The treatment of talc with solid resins, such as hydrogenated petroleum resin, wax (e.g., stearic acid) or a combination of such substances to improve the talc's compatibility with polyolefins is shown in Matsumoto et al Japanese Kokai 78 65,346, published June 10, 1978 [Chem. Abst. 89: 147656q (1978)].

Goel et al, Polym. Eng. Sci., Vol. 20, No. 3, pp. 198-201 (1980) [Chem. Abst. 92: 129772g (1980)], disclose adding small amounts of oligomeric polypropylene oxide to talc-filled isotactic polypropylene to decrease both viscosity and elasticity.

A 1978 Research Disclosure, Vol. 173, No. 19 [Chem. Abst. 89: 180758x (1978)] teaches that low melting cellulose acetate butyrate is a good heat stabilizer for talc-filled polypropylene.

Copending U.S. patent application Ser. No. 003,242 relates to the discovery that Montana talc and like talcs regarded, in the unbeneficated state, as inferior fillers for thermoplastic resinous compositions, and particularly polypropylene molding resins, because they discolor the resinous matrix when subjected to typical molding conditions and adversely affect its long-term heat stability, can be rendered suitable for this use, at low cost, by treatment with novel combinations of particular amounts of certain materials. Thermoplastic resinous molded articles containing the thus-treated talcs have been found to exhibit significantly reduced darkening (as measured by the General Electric brightness test), without unacceptably increased yellowing (as measured by the Hunterlab yellowness index), and improved heat stability (as measured by oven aging) when compared to molded articles containing the corresponding untreated, inferior talc.

Talcs such as certain Chinese, Australian and Italian talcs, in contrast to Montana talc and like talcs, are acceptable fillers for thermoplastic resinous compositions such as polypropylene molding resins, and give molding resins which do not discolor when molded and ordinarily exhibit no unacceptable diminution in long-term heat stability as compared to the unfilled resin. It has now been discovered, however, that one or both of the brightness and heat stability of thermoplastic molded articles filled with such acceptable talcs can be unexpectedly enhanced, while maintaining acceptably comparable tensile properties (flexural modulus, Gardner impact strength, Izod impact strength and heat deflection temperature), by treating those of such acceptable talcs which, when ground to an approximately 2.5-5.0 $\mu$m median particle size, exhibit a wet powder brightness (GE brightness or "GEB") of at least about 30%, with the novel beneficiating compositions disclosed in copending application Ser. No. 003,242.

It is, therefore, an object of this invention to provide novel, improved, beneficiated talcs.

A further object of this invention is to provide thermoplastic resinous compositions filled with novel, improved, beneficiated talcs.

Another object of this invention is to provide beneficiated acceptable talcs which, when incorporated as fillers in thermoplastic molded articles, result in such articles exhibiting enhanced brightness, heat stability, or both, as compared to articles molded from compositions containing the corresponding unbeneficiated talc as filler, while maintaining acceptably comparable tensile properties.

These and other objects, as well as the nature, scope and utilization of this invention, will become readily apparent to those skilled in the art from the following description and the appended claims.

SUMMARY OF THE INVENTION

It has now been discovered that an effective amount of a combination of:

(A) one or a mixture of octyl-or nonylphenol/poly(ethylene oxide) condensates, and (B) one or a mixture of poly(ethylene glycols) or alkoxypoly (ethylene glycols), can be applied to a talc which, in its unbeneficiated state, is an acceptable filler for thermoplastic resinous compositions and which, when ground to an approximately 2.5–5.0 μm median particle size, exhibits a wet powder brightness (determined according to the procedure described hereinbelow) of at least about 30%. Such talcs include Chinese talcs, Australian talcs, including cosmetic grade Autralian talcs, Italian talcs, and like talcs. This beneficiating combination will further enhance the brightness, heat stability or both of thermoplastic molded articles, such as polypropylene molded articles, filled with such beneficiated talcs, while maintaining tensile properties acceptably comparable to those found in articles molded from thermoplastic resinous compositions filled with the corresponding unbeneficiated talcs.

Such additive combinations do not cause unpleasant odors in talc-filled molding resins containing them. These additive combinations are also of a relatively low order of toxicity, and hence do not prevent the beneficiated talc-containing resinous compositions of this invention from being used to prepare molded articles which can come in contact with foods, e.g. microwave oven and refrigerator liners.

DETAILED DESCRIPTION OF THE INVENTION

The octyl- or nonylphenol/poly(ethylene oxide) condensates employed in practicing this invention can be represented by the general formula:

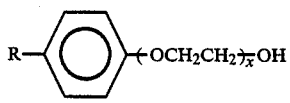

(I)

wherein R represents one or a mixture of $C_8$ or $C_9$ alkyl groups, preferably branched-chain isomers such as an isooctyl group,

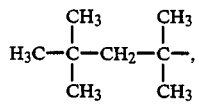

and x is a number of from about 3 to about 40, indicating the average number of ethylene oxide units in the ether side chain. Members of the octylphenol and nonylphenol series of nonionic surfactants sold by Rohm and Haas Company under the trademark Triton can be used in practicing this invention, and Triton X-114 surfactant, an octylphenol/poly(ethylene oxide) condensate having, an average, 7-8 ethylene oxide units in the ether side chain, is particularly preferred.

The poly(ethylene glycols) and alkoxypoly(ethylene glycols) which can be used in practicing the present invention can be represented by the general formula:

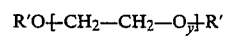

(II)

wherein R' represents hydrogen or a lower alkyl group having from 1–4 carbon atoms, inclusive, preferably methyl or ethyl, and y is a number such that the average molecular weight of the poly(ethylene glycol) or alkoxypoly(ethylene glycol) is from about 100 to about 20,000, and preferably from about 200 to about 14,000.

Members of the series of poly(ethylene glycols) and alkoxypoly(ethylene glycols) sold by Union Carbide Corporation under the trademark Carbowax can be used in practicing this invention; Carbowax polyethylene glycol 200 (y=about 4) and Carbowax polyethylene glycol 300 (y=about 6) which are liquids at room temperature, are particularly preferred. Higher molecular weight solid members of this series can, of course, be used, but are somwheat more difficult to work with.

Ordinarily, in practicing this invention a Chinese, Australian, Italian or like talc having incorporated therewith an effective, beneficiating amount of a combination of one or a mixture of the octyl- or nonylphenol/poly(ethylene oxide) condensates and one or a mixture of the poly(ethylene glycols) or alkoxypoly(ethylene glycols) will be used as a reinforcing filler in articles molded from commercially available, heat-stabilized thermoplastic, e.g., polypropylene, resins. The amount of such combinations of beneficiating additives employed will be sufficient to beneficiate or upgrade the in-use performance of a talc although acceptable as a filler which, prior to beneficiation, does not furnish the property levels set out immediately hereinbelow.

As indicated above, one measure of acceptability as a filler is a wet powder brightness (GEB) of at least about 30% exhibited by a talc which has been found to an approximately 2.5–5.0 μm median particle size. Representative talcs for which wet powder brightness has been determined in the manner described hereinbelow are:

| Talc | Median Particle Size (μm) | Wet Powder Brightness (GEB. %) |
|---|---|---|
| Mistron 400 Montana Yellowstone | 4.5 | 20.2 |
| Mistron PV Chinese | 2.6 | 46.8 |
| No. 6 Hegman Australian Cosmetic Grade | 2.9 | 41.7 |
| Suprafino Italian | 5.0 | 33.6 |

Beneficiation in the manner taught by this invention will upgrade a Chinese, Australian, Italian or like talc's performance to the point at which the molded article, at 40 weight percent filler loading in Amoco 1046 polypropylene resin, exhibits improvement in at least one and preferably both of brightness (GE brightness, measured in the manner described below or in an equivalent manner) and oven life upon aging at 155° C., and in fact brightness will usually be improved, together with improvement or at least no unacceptable diminution in other significant physical properties, particularly flexural modulus and impact strength. In general, such a molded article will exhibit a GE brightness of at least about 30% and withstand oven aging at 155° C. in an atmosphere of air for at least 10 days. Its flexural modulus will be at least about 440 ksi, its Gardner impact strength will be at least about 8.0 f.-lbs./in., its notched Izod impact strength will be at least about 0.45 ft./lb. in notch, and its heat deflection t4emperature will be at least 160° F. at 264 psi.

An effective amount of a beneficiating composition of this invention which will provide the aforementioned levels of property improvement, and particularly acceptable brightness, acceptable oven life at 155° C., or both to a thermoplastic, e.g., polypropylene molded article filled with a Chinese, Australian, Italian or like talc usually will range from about 0.05% to about 4.0% by weight, and preferably from about 0.2% to about 1.50% by weight, of one or a mixture of the octyl- or nonylphenol/poly(ethylene oxide) condensates, and from about 0.05% to about 4.0% by weight, and preferably from about 0.2% to about 1.50% by weight, of one or a mixture of the poly(ethylene glycols) or alkoxypoly(ethylene glycols). The total amount of octyl- or nonylpheol/poly(ethylene oxide (condensate(s) and poly[ethylene glycol(s)] or alkoxypoly [ethylene (glycols)] combined ordinarily will be no more than about 5.0% by weight, and preferably no more than about 3% by weight. The aforementioned weight percents are each based on the weight of the unbeneficiated talc being treated.

These beneficiating materials can be mixed with the talc before adding it to the remaining ingredients of themolding composition, and indeed before grinding the talc, if desired, or they can be mixed with these ingredients and the talc in any other desired order, either before or while talc is compounded with the remaining components of the molding resin composition (e.g., they can be added to the blender or to the melt in an extruder from which molding resin pellets are obtained). When these materials are mixed with the talc itself, they may be added to the talc directly or first dissolved in a suitable organic solvent, preferably a polar solvent such as a lower alkanol, e.g., ethanol or isopropanol, a ketone such as acetone, methyl ethyl ketone or methyl isobutyl ketone, a low molecular weight Cellosolve, e.g., 2-butoxyethanol, and the like, or mixtures thereof, then added to the talc, e.g., by spraying or wet blending, and the solvent evaporated.

Treated talcs can be prepared in a Henschel or similar blender or the like which can used to mix and blend the ingredients to macrohomogeniety, i.e., to less than complete uniformity, particularly when a relatively small sample is considered, or to greater uniformity of desired, at any temperature up to the decomposition point of the most easily decomposable component. The treated talcs can be compounded with the resin using a Leistritz compounder-extruder or other suitable device.

Molding compositions containing the treated talcs of this invention, particularly, those compositions used to provide molded articles intened for use in elevated temperature environments, can also contain conventionally-employed types and amounts of other additives: primary antioxidants (heat-stabilizers) including hindered phenols such as:
1,3,5-tris(4-tert-butyl-3-hydroxy-2,6-dimethylbenzyl)-1,3,5-triazine-2,4,6,(1H,3H,5H)-trione,
1,3,5-trimethyl-2,4,6-tris[3,5-di-ter-butyl-4-hydroxybenzyl]benzene,
2,6-di-tert-butyl-4-methylphenol, tetrakis[methylene(3,5-di-tert-butyl-4-hydroxycinnamate)]methane,
N,N'-hexamethylenebis(3,5-di-tert-butyl-4-hydroxyhydrocinnamamide),
O,O-di-n-octadecyl-3,5-di-tert-butyl-4-hydroxy benzyl phosphonate,
2,4-bis(n-octylthio)-6-(4-hydroxy-3,5-di-tert-butylanilino)-1,2,5-triazine,
thiodiethylenebis(3,5,-tert-butyl-4 hydroxy)hydrocinnamate, octadecyl 3,5-di-tert-butyl-4-hydroxyhydrocinnamate,
tris(3,5-di-tert-butyl-4-hydroxybenzyl)isocyanurate,
1,1,3,-tris(5-tert-butyl-1,4-hydroxy-2-methylphenyl)butane,
and the like, esters such as octadecyl-3-(3,5-di-tert-butyl-4-hydroxyphenyl)propionate, pentaerythritol tetra-[3-(3,5-di-tert-butyl-4-hydroxyphenyl)propionate],
and the like, secondary stabilizers, e.g., dialkylthiodipropionates such as distearylthiodipropionate, dilaurylthiodipropionate, epoxides, and the like, extendeers such as calcium carbonate, pigments, e.g., carbon black and titanium dioxide, dyes, mold lubricants, e.g., calcium stearate, other reinforcing agents, e.g. fibrous reinforcing agents such as glass fiber, carbon or carbon/graphite fibers, and the like.

Besides polypropylene molding resins, any other thermoplastic materials fillable with talc or other reinforcing fillers, including other polyolefin polymers, such as homopolymers, copolymers and blends containing them, polyesters such as polyethylene terephthalate, poly(1,4-butanediol)terephthalate, and the like, all-aromatic polyesters, e.g., aromatic diacid/aromatic diol/±hydroxy aromatic acid copolymers, polycarbonates, polyoxymethylene homo- and copolymers, e.g., acid anhydride end-capped oxymethylene homopolymers and trioxane/ethylene oxide copolymers, ABS, SBR, EPDM and neoprene rubbers, polyisoprene, and the like can be filled with the benficiated talcs of this invention, using art-recognized techniques.

The beneficiated talcs of the present invention can be used as fillers in thermoplstic resinous compositions in the amounts in which talc has hitherto been used for this purpose. Typical filler loadings can range from about 10% to about 50% by weight, and preferably from about 15% to about 30% by weight, or from about 35% to about 50% by weight, based on the total weight of the filled composition. Amounts of the beneficiated talcs of this invention within these ranges will be used, for example, when polypropylene is the resin being filled.

In order that those skilled in the art can more fully understand this invention, the following examples are set forth. These examples are given solely for purposes of illustration, and should not be considered as expressing limitations unless so set forth in the appended claims. All parts and percentages are by weight, unless otherwise stated.

EXAMPLES 1 AND 2

A single batch of Mistron PV Chinese talc (Cyprus Industrial Minerals Company) having a median particle size of approximately 2.6 $\mu$m and a particle size distribution such that 80% of the particles are finer than about 4.5 $\mu$m and 20% of them are finer than about 0.75 $\mu$m was used for both of these examples. In all cases when describing particle size in terms of the percent of particles finer than a specified diameter, the word "particles" actually refers to the total mass of all particles in the sample whose diameters are smaller than the specified value. Similarly, the median particle size is defined as the particular particle diameter where exactly one-half the total mass of the sample is composed of particles having lesser diameters.

In Example 1 a sample of talc treated with the amount and type of additives listed in Table 1 below was mixed with Amoco 1046 polypropylene, an antioxidant-containing resin, at a temperature ranging from 325°–430° F. in a Leistritz compounder-extruder. In Example 2, no additives were used on the talc.

In each case, a filled resin batch having a talc content of 40%, based on the total weight of the batch, was prepared. Each such batch was then used to prepare, by melting at a temperature of 360°–435° F., using an Arburg injection molding machine, and then injecting into a 140° F. steel mold and holding under pressure for 56 seconds, sufficient quantities of discs and tensile bars conforming to ASTM and other applicable standards to permit testing according to ASTM standards, variations thereof, and other test methods as described hereinbelow.

The following tests were performed on these molded discs or bars from each talc sample:

1. Oven Aging—a procedure used to evaluate the relative thermal stabilities of the injection molded polypropylene specimens.

One tensile bar and one disc of each material tested were placed on the stainless steel grills of a force-air circulation oven (Despatch Oven Company; Ser. No. 9376-3L) at 155° C. (measured by the oven's outside indicator and a temperature dial gauge placed inside the oven) and the starting time (day and time specimens were placed in the oven) was noted. The oven grils were shifted once daily (except on weekends) in a pattern which insured uniform air exposure.

The specimens were inspected once a day (execpt on weekends), and a specimen was considered to have failed when approximately 10% of its surface showed "crazing" (surface cracks or deterioration), embrittlement or serious discoloration. The oven temperature as indicated inside and outside the oven was recorded at this time, as was the inspection time (in clock hours from the start of the test) and any observed failures. The oven life of a sample was expressed in days to failure.

2. GE Brightness (GEB)—a procedure used to determine the brightness of the injection molded polypropylene specimens.

A minimum of three (and preferably five) specimen discs were evaluated for each material tested. After first making certain that the filter wheel of a Technidyne brightimeter, Model S-4, was in position 1 and centered, the instrument was turned on and its calibration checked by placing an opal glass standard block over the sample opening and then adjusting the "Cal Adjust" knobs on the front of the instrument so that the instrument read the brightness value indicated on the standard. The calibration was rechecked in this fashion every few minutes while the instrument was in actual use.

A specimen disk was then set over the sample opening and a 1 kg brass weight placed on top of the sample. The digital panel meter settled on a reading in 1–2 seconds:

if the last digit of this reading oscillated between two numbers, the one which predominated was chosen;

if neither number predominated, the lower digit was chosen.

The instrument's "Enter" knob was then pressed to print the reading by means of a Canon printer, Model cp 1002.

This procedure was then repeated:

to obtain readings from three different surface spots on each disc;

to obtain readings for 3–5 discs representing each material tested.

After each 9–15 readings, the "Average" knob was pressed to obtain the average of the readings for each sample.

The procedure for determining *Wet Powder Brightness*, i.e., the brightness of unbeneficiated talc, is carried out as follows:

Six grams of paraffin wax flakes (Kodak, granular) and four grams of the talc being tested (2.5–5.0 μm median particle size) are mixed in an approximately 2 inch diameter aluminum tart pan. The pan is placed on a hot plate (approximately 280° F. plate surface temperature) and the paraffin melted completely. After stirring to give a uniform mixture and then allowing the mixture to cool, the sample is removed from the pan and tested for brightness/color using a suitable instrument, e.g., the aforementioned Technidyne brightimeter or a Hunterlab colorimeter.

3. Flexural Modulus—ASTM D-790.

4. Gardner Impact Test—a procedure for determining the energy required for a falling weight applied under specified conditions to crak or break the injection molded polypropylene specimens.

A minimum of twenty specimen discs, allowed to age under ambient lab conditions for a minimum of 7 days before testing, were impacted for each material tested. Next, using a micrometer, the average nominal thickness of these discs was determined.

A specimen disc was then positioned, with the knockout pin marks facing up, over the support anvil of a Gardner Laboratories Model IG-1120 Variable Height Impact Tester having cylindrical 2, 4 and 8 lb. weights which can be dropped through a vertical guide tube for distances of up to about 1 meter (40 inches). The tip of the instrument's impactor was positioned to rest at the center point on the disc.

A 2 lb. weight was raised to the desired height and released. This allowed the weight to fall freely and strike the impact plunger. After impact, the disc was removed and the impacted area visually inspected for failure. Failure is defined as any of the following conditions:

the disc was broken to pieces;

the center area protruded on the disc surface opposite the one having the knockout pin marks;

if neither of these conditions obtained, the disc was bent by hand and then visually reexamined for cracks on the surface opposite the one having the knockout pin marks; if cracks occurred, and the depth of any one of them was more than one-third the thickness of the disc, this was considered a failure.

The starting point for the staircase (up and down) method was determined on several impacts by halving or doubling the drop height until a pass-fail point was determined. The next specimen was impacted using the drop height corresponding to the pass-fail point determined in this manner. If the specimen pass, the next specimen was tested at a drop height one inch higher. If the specimen failed, the next specimen was impacted at a drop height one inch lower. This procedure was continued until twenty specimens were tested, with a running record being kept of failures and non-failures.

Calculations

$h = h_o + d(A/N) \pm 0.5D$

Where:
- h = mean failure height, in.
- d = increment of height, in. (=1 in.)
- N = total number of failures or non-failures (events), whichever was smaller. If they were equal, failures were used.
- $h_o$ = lowest height at which an event ocurred, in.

$$A = \sum_{i=0}^{K} i n_i$$

- i = 0,1,2, ... K (counting index, 0 starts at $h_o$)
- $n_i$ = number of events occurring at $h_i$
- $h_i = h_o + id$
- $h_k$ = largest height at which an event occurred, in.
- ± = for failures — was used; for non-failures + was used.
- MFE = hWf Where:
- MFE = mean failure energy (50% failure), joules or inch-pounds
- h = mean failure height, in.
- W = weight, lb.
- f = factor for conversion to joules
  = 1.0 to get US units (in.-lbs.) if h = in. and W = lbs.

$$S = \left[ 1.620\, d \left( \frac{NB - A^2}{N^2} + 0.029 \right) \right] W$$

Where:
- S = estimated standard deviation $$B = \sum_{i=0}^{K} i^2 n_i$$

5. Heat Deflection Temperatures - ASTM D-648 (264 psi).
6. Izod Impact Strength - ASTM D-256.

The results of these tests are set out in Table I below. In this and all subsequent tables the notation "wt.%" in the "Additive(s)" columns is a close approximation of actual weight percents used. The actual additive additions were made based on parts of additive(s) added per hundred parts of talc filler.

TABLE I

| Example | Additives | Oven Aging[1] | GE Brightness[2] | Flexural Modulus[3] | Gardner Impact Strength[4] | Heat Deflection Temperature[5] | Izod Impact Strength[6] |
|---|---|---|---|---|---|---|---|
| 1 | 1.12 wt. % Triton X-114 0.38 wt. % Carbowax 300 | 20 | 43.11 | 607 | 12.5 | 192 | 0.51 |
| 2 | None | 11 | 31.73 | 625 | 7.8 | 179 | 0.52 |

[1] Days to failure; fdw = failed during weekend, hence, number of days to failure given may be one or two less than recorded.
[2] Percent.
[3] $10^3$ psi.
[4] In ft.-lb./in. of thickness
[5] In °F. at 264 psi fiber stress.
[6] In ft.-lb./in. of notch.

EXAMPLES 3 AND 4

The procedure of Examples 1 and 2 was repeated in every essential detail but one, namely, the talc used in Examples 3 and 4 was from a single bath of Mistron P-1 Chinese talc (Cyprus Industrial Minerals Company) having a median particle size of approximately 3.7 μm and a particle size distribution such that 80% of the particles are finer than about 6.3 μm and 20% of them are finer than about 1.6 μm. In Example 3 the talc was additive-treated; in Example 4 no beneficiating additives were used.

The results of the tests performed on molded specimens of the thus-obtained molding resins are given in Table II below. Notes 1-6, are the same as for Table I.

TABLE II

| Example | Additives | Oven Aging[1] | GE Brightness[2] | Flexural Modulus[3] | Gardner Impact Strength[4] | Heat Deflection Temperature[5] | Izod Impact Strength[6] |
|---|---|---|---|---|---|---|---|
| 3 | 1.12 wt. % Triton X-114 0.38 wt. % Carbowax 300 | 20 | 41.4 | 596 | 10.5 | 189 | 0.53 |
| 4 | None | 16 | 30.3 | 596 | 8.1 | 181 | 0.53 |

EXAMPLES 5-12

The procedure of Examples 1 and 2 was again repeated in every essential detail except for the following:

the talc used in Examples 5 and 6 was from a single batch of 200 mesh Australian cosmetic grade talc having a median particle size of approximately 12 μm and a particle size distribution such that 80% of the particles are finer than about 25 μm and 20% of them are finer than about 4.3 μm;

the talc used in Examples 7 and 8 was from a single batch of 325 mesh Australian cosmetic grade talc having a median particle size of approximately 5.4 μm and a particle size distribution such that 80% of the particles are finer than about 9.8 μm and 20% of them are finer than about 2.4 μm;

the talc used in Examples 9 and 10 was from a single batch of No. 5 Hegman Australian cosmetic grade talc having a median particle size of approximately 2.7 μm and a particle size distribution such that 80% of the particles are finer than about 4.6 μm and 20% of them are finer than about 1.1 μm;

the talc used in Examples 11 and 12 was from a single batch of No. 6 Hegman australian cosmetic grade talc having a median particle size of approximately 2.9 μm and a particle size distribution such that 80% of the particles are finer than about 4.9 μm and 20% of them are finer than about 1.3 μm;

In Examples 5, 7, 9 and 11 the talc was additive treated; in Examples 6, 8, 10 and 12 no beneficiating additives were used.

The results of the tests performed on molded specimens of the thus-obtained molding resins are given in Table III below. Notes 1-6 are the same as for Table I.

TABLE III

| Example | Additives | Oven Aging[1] | GE Brightness[2] | Flexural Modulus[3] | Gardner Impact Strength[4] | Heat Deflection Temperature[5] | Izod Impact Strength[6] |
| --- | --- | --- | --- | --- | --- | --- | --- |
| 5 | 0.88 wt. % Triton X-114 0.30 wt. % Carbowax 300 | 21 | 30.0 | 445 | 10.9 | 163 | 0.48 |
| 6 | None | 16 | 19.3 | 499 | 11.6 | 167 | 0.53 |
| 7 | 0.88 wt. % Triton X-114 0.30 wt. % Carbowax 300 | 17 (f.d.w.) | 33.4 | 524 | 8.6 | 172 | 0.51 |
| 8 | None | 13 | 22.1 | 605 | 7.9 | 171 | 0.54 |
| 9 | 0.88 wt. % Triton X-114 0.30 wt. % Carbowax 300 | 13 (f.d.w.) | 41.9 | 587 | 8.4 | 181 | 0.50 |
| 10 | None | 8 | 25.8 | 664 | 6.5 | 190 | 0.48 |
| 11 | 0.88 wt. % Triton X-114 0.30 wt. % Carbowax 300 | 17 | 40.1 | 607 | 8.5 | 177 | 0.53 |
| 12 | None | 8 | 27.6 | 671 | 11.2 | 173 | 0.54 |

EXAMPLES 13 AND 14

The procedure of Examples 1 and 2 above was again repeated in every essential detail but one, namely, the talc used in Examples 13 and 14 was from a single batch of Suprafino Italian talc (Cyprus Industrial Minerals Company) having a median particle size of approximately 4.9 μm and a particle size distribution such that 80% of the particles are finer than about 8.9 μm and 20% of them are finer than about 2.2 μm. In Examples 13, the talc was additive treated; in Examples 14 no beneficiating additives were used.

The results of the tests performed on molded specimens of the thus-obtained molding resins are given in Table IV below. Notes 1-6 are the same as for Table I.

TABLE IV

| Example | Additives | Oven Aging[1] | GE Brightness[2] | Flexural Modulus[3] | Gardner Impact Strength[4] | Heat Deflection Temperature[5] | Izod Impact Strength[6] |
| --- | --- | --- | --- | --- | --- | --- | --- |
| 13 | 1.12 wt. % Triton X-114 0.38 wt. % Carbowax 300 | 13 | 33.7 | 669 | 8.5 | 201 | 0.53 |
| 14 | None | 21 (f.d.w.) | 27.9 | 708 | 8.1 | 205 | 0.52 |

The above discussion of this invention is directed primarily to preferred embodiments and practices thereof. It will be readily apparent to those skilled in the art that further changes and modifications in the actual implementation of the concepts described herein can easily be made without departing from the spirit and scope of the invention as defined by the following claims.

I claim:

1. A beneficiated talc suitable for use as a filler for thermoplastic resinous compositions comprising a talc which, when ground to an approximately 2.5-5.0 μm median particle size, exhibits a wet powder brightness of at least about 30%, admixed with:
   (a) one or a mixture of otyl- or nonylphenol/-poly(ethylene oxide) condensates, and
   (b) one or a mixture of poly(ethylene glycols) or alkoxypoly(ethylene glycols), said (a) and said (b) each being present in an amount ranging from about 0.05% to about 4.0% by weight, with the total combined amount of said substances being no more than about 5.0% by weight, said weight percents being based on the weight of the unbeneficiated talc.

2. A beneficiated talc as recited in claim 1 in which said (a) is an octylphenol/poly(ethylene oxide) condensate.

3. A beneficiated talc as recited in claim 1 in which said (b) is a poly(ethylene glycol).

4. A beneficiated talc as recited in claim 1 in which said (a) is an octylphenol/poly(ethylene oxide) condensate having an average of 7-8 ethylene oxide units in its ether side chain and said (b) is a poly(ethylene glycol) having a molecular weight of from about 200 to about 300.

5. A beneficiated talc as recited in caim 1 in which said talc is a Chinese talc.

6. A beneficiated talc as recited in claim 1 in which said talc is an Australian talc.

7. A beneficiated talc as recited in claim 1 in which said talc is an Italian talc.

8. A beneficiated talc as recited in any one of claim 1-4, inclusive in which said octyl- or nonylphenol/-poly(ethylene oxide) condensate and said poly(ethylene glycol) or alkoxypoly(ethylene glycol) are each present in an amount ranging from about 0.2% to about 1.5% by weight, with the total combined amount of said substances being no more than about 3.0% by weight, said weight percents being based on the weight of the unbeneficiated talc.

9. A beneficiated talc as recited in claim 8 in which said talc is a Chinese talc.

10. A beneficiated talc as recited in claim 8 in which said talc is an Australian talc.

11. A beneficiated talc as recited in claim 8 in which said talc is an Italian talc.

* * * * *

UNITED STATES PATENT AND TRADEMARK OFFICE
CERTIFICATE OF CORRECTION

PATENT NO. : 4,814,019
DATED : March 21, 1989
INVENTOR(S) : Kenneth E. Weber

It is certified that error appears in the above-identified patent and that said Letters Patent is hereby corrected as shown below:

Column 1, line 18, change "brighness" to -- brightness --;

Column 2, line 36, change "when" to -- what --;

Column 2, line 43, before "24," insert -- 23, --;

Column 3, line 18, change "sspecifically" to -- specifically --;

Column 3, line 54, change "aspolyethylene" to -- as polyethylene --;

Column 4, line 20, change "unbeneficated" to -- unbeneficiated --;

Column 5, line 60, change "3to" to -- 3 to --;

Column 6, line 21, change "somwheat" to -- somewhat --;

Column 7, line 5, change "t4emperature" to -- temperature --;

Column 7, line 30, change "themolding" to -- the molding --;

Column 8, line 18, change "extendeers" to -- extenders --;

Column 8, line 39, change "thermoplstic" to -- thermoplastic --;

Column 9, line 33, change "grils" to -- grills --;

UNITED STATES PATENT AND TRADEMARK OFFICE
CERTIFICATE OF CORRECTION

PATENT NO. : 4,814,019
DATED : March 21, 1989
INVENTOR(S) : Kenneth E. Weber

It is certified that error appears in the above-identified patent and that said Letters Patent is hereby corrected as shown below:

Column 10, line 29, change "crak" to -- crack --;

Column 12, line 44, change "australian" to -- Australian --;

Column 13, line 58, change "otyl-" to -- octyl --; and

Column 14, line 32, change "caim" to -- claim --.

Signed and Sealed this

Twentieth Day of March, 1990

Attest:

JEFFREY M. SAMUELS

Attesting Officer

Acting Commissioner of Patents and Trademarks